(12) United States Patent
Mejdrich et al.

(10) Patent No.: US 9,354,887 B2
(45) Date of Patent: May 31, 2016

(54) INSTRUCTION BUFFER BYPASS OF TARGET INSTRUCTION IN RESPONSE TO PARTIAL FLUSH

(75) Inventors: Eric O. Mejdrich, Woodinville, WA (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1456 days.

(21) Appl. No.: 12/824,812

(22) Filed: Jun. 28, 2010

(65) Prior Publication Data

US 2011/0320771 A1    Dec. 29, 2011

(51) Int. Cl.
*G06F 9/38* (2006.01)
*G06F 12/08* (2016.01)

(52) U.S. Cl.
CPC ............ *G06F 9/3814* (2013.01); *G06F 9/3861* (2013.01); *G06F 12/0853* (2013.01); *G06F 2205/065* (2013.01)

(58) Field of Classification Search
None
See application file for complete search history.

(56) References Cited

U.S. PATENT DOCUMENTS

| | | | | | |
|---|---|---|---|---|---|
| 4,635,194 | A | * | 1/1987 | Burger et al. | 712/205 |
| 5,604,909 | A | * | 2/1997 | Joshi et al. | 712/208 |
| 5,928,354 | A | * | 7/1999 | Umeki et al. | 712/205 |
| 6,170,053 | B1 | * | 1/2001 | Anderson et al. | 712/240 |
| 6,212,603 | B1 | * | 4/2001 | McInerney et al. | 711/125 |
| 6,247,120 | B1 | * | 6/2001 | Schwendinger | 712/238 |
| 6,347,369 | B1 | * | 2/2002 | Witt | 712/240 |
| 6,442,674 | B1 | * | 8/2002 | Lee et al. | 712/205 |
| 6,618,801 | B1 | * | 9/2003 | Knebel et al. | 712/215 |
| 6,711,668 | B1 | * | 3/2004 | Wojcieszak et al. | 712/207 |
| 7,080,170 | B1 | * | 7/2006 | Zuraski et al. | 710/52 |
| 2004/0128477 | A1 | * | 7/2004 | Henry et al. | 712/207 |
| 2005/0273579 | A1 | * | 12/2005 | Elmer | 712/218 |
| 2007/0113059 | A1 | * | 5/2007 | Tran | 712/241 |

OTHER PUBLICATIONS

Eggers et al. (Eggers) (Simultaneous Multithreading: A Platform for Next-Generation Processors); IEEE Micro, Sep./Oct. 1997, pp. 12-19.*

* cited by examiner

*Primary Examiner* — Keith Vicary
(74) *Attorney, Agent, or Firm* — Middleton Reutlinger

(57) ABSTRACT

A circuit arrangement and method selectively bypass an instruction buffer for selected instructions so that bypassed instructions can be dispatched without having to first pass through the instruction buffer. Thus, for example, in the case that an instruction buffer is partially or completely flushed as a result of an instruction redirect (e.g., due to a branch mispredict), instructions can be forwarded to subsequent stages in an instruction unit and/or to one or more execution units without the latency associated with passing through the instruction buffer.

24 Claims, 7 Drawing Sheets

US 9,354,887 B2

1

INSTRUCTION BUFFER BYPASS OF TARGET INSTRUCTION IN RESPONSE TO PARTIAL FLUSH

FIELD OF THE INVENTION

The invention is generally related to data processing, and in particular to instruction units in computer processors.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Modern processor architectures often rely on instruction units to fetch program instructions from a memory, decode the instructions, and then dispatch those instructions to one or more execution units for execution. Pipelining may be used in such instruction units to maximize instruction throughput, and moreover, multithreading may be used to enable multiple instructions (either from multiple instruction streams or from the same instruction stream) to be dispatched to different execution units within a processor during a given cycle. In addition, predictive logic such as branch prediction may be used in order to try to guess in advance what instructions will be needed from a given instruction stream so that those instructions can be fetched earlier to minimize the delay that would otherwise occur were those instructions retrieved from memory only after the condition for a conditional branch was actually tested.

The goal of an instruction unit is to provide instructions to execution units as quickly as possible to maximize instruction throughput, and thus the overall performance of the processor. In this regard, many instruction units incorporate instruction buffers, which are high speed dedicated memory arrays that temporarily store instructions awaiting execution. Given that a processor typically executes at a much faster rate than instructions can be retrieved from a memory, an instruction buffer serves to maintain a pool of instructions awaiting execution so that the execution units are starved of instructions as infrequently as possible.

In general, the larger the instruction buffer, the less likely execution units will ever be starved of instructions. Assuming branches in instruction streams are correctly predicted, and assuming enough instructions are maintained in the instruction buffer to cover for any misses to the instruction cache that feeds the instruction unit, the flow of instructions to the execution units will be maximized.

A larger instruction buffer, however, does not come without some drawbacks. First, larger instruction buffers require more circuitry, and thus increase power consumption and take up valuable real estate on a chip. Second, the performance penalty that occurs whenever an instruction buffer needs to be flushed (e.g., due to a branch mispredict) is increased for larger instruction buffers. Instruction buffers are fundamentally similar to shift registers, and as such, a new instruction added to an empty instruction buffer may require several clock cycles to progress to the end of the instruction buffer where it is ready to be dispatched to an execution unit, thereby leaving several cycles in which the execution units are starved of work.

Therefore, a need exists in the art for an improved instruction buffer design that is more efficient and more tolerant of flushes.

SUMMARY OF THE INVENTION

The invention addresses these and other problems associated with the prior art by providing a circuit arrangement and method that selectively bypass an instruction buffer for selected instructions so that bypassed instructions can be dispatched without having to first pass through the instruction buffer. Thus, for example, in the case that an instruction buffer is partially or completely flushed as a result of an instruction redirect (e.g., due to a branch mispredict), instructions can be forwarded to subsequent stages in an instruction unit without the latency associated with passing through the instruction buffer.

Therefore, consistent with one aspect of the invention, a circuit arrangement includes a pipelined instruction unit including an instruction buffer configured to buffer instructions received from a cache memory prior to dispatch of the instructions to at least one execution unit, and bypass logic coupled to the instruction unit and configured to selectively cause at least one instruction received from the cache memory to bypass the instruction buffer in response to determining that the instruction buffer currently has an insufficient number of instructions buffered therein to dispatch to the at least one execution unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize bypass logic in an instruction unit to selectively cause instructions to bypass an instruction buffer in instances where the instruction buffer has an insufficient number of instructions buffered therein to dispatch to any execution units serviced by the instruction unit. For example, as a result of a branch mispredict, an instruction cache miss, a translation miss, or even after a particularly efficient sequence of instructions where the instruction buffer is incapable of providing all of the instructions that it could otherwise provide to subsequent pipeline stages in a given clock cycle, the bypass logic avoids the need to pass additional instructions that may be retrievable from the instruction cache completely through the instruction buffer prior to providing those instructions to subsequent pipeline stages. Instead, the additional instructions may, in many cases, bypass the instruction buffer completely, thereby saving the latency otherwise associated with passing through the instruction buffer.

A number of variations and modifications to the illustrated embodiments will be apparent to one of ordinary skill in the art. Therefore, the invention is not limited to the specific implementations discussed herein.

Hardware and Software Environment

Figure 1:
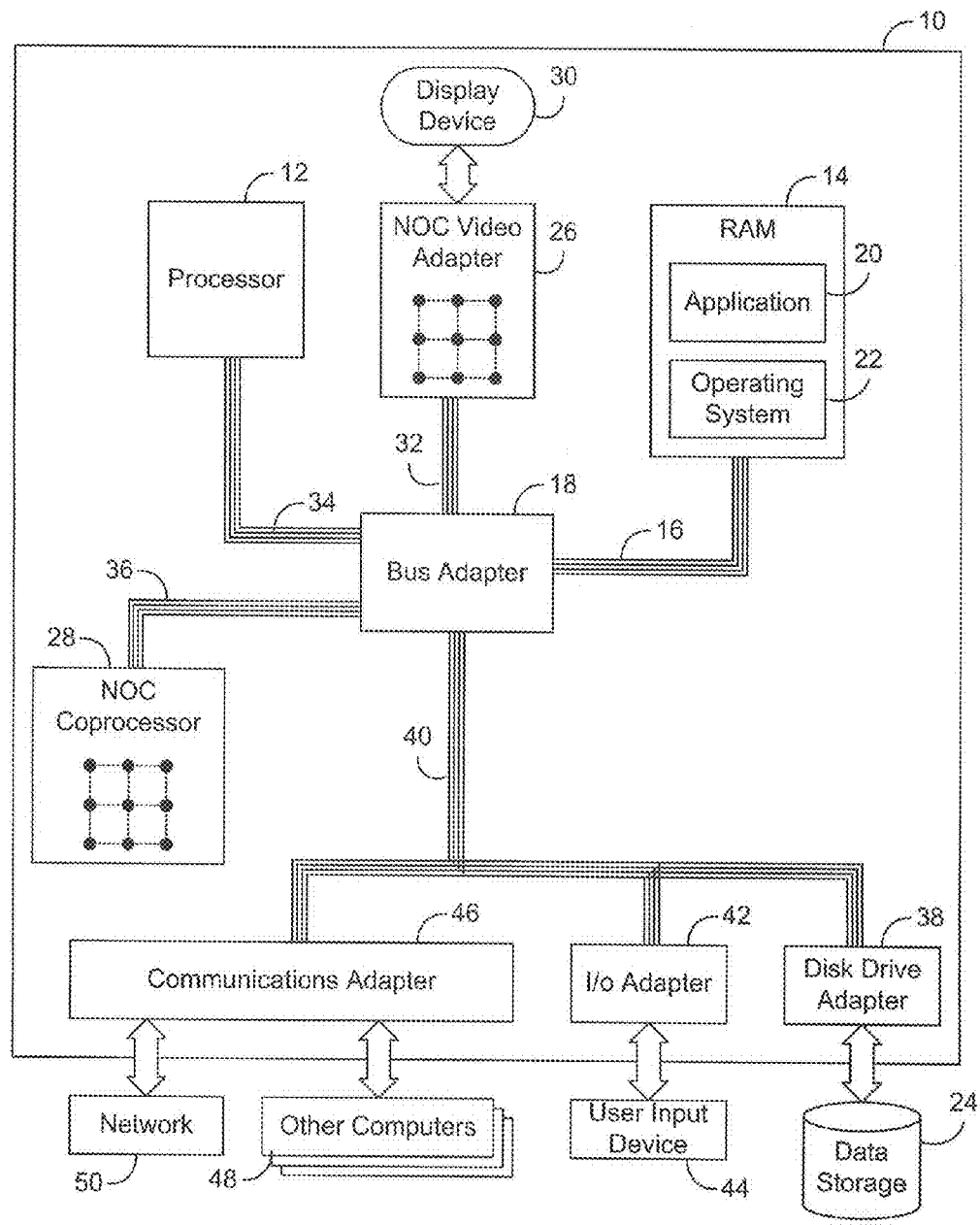
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
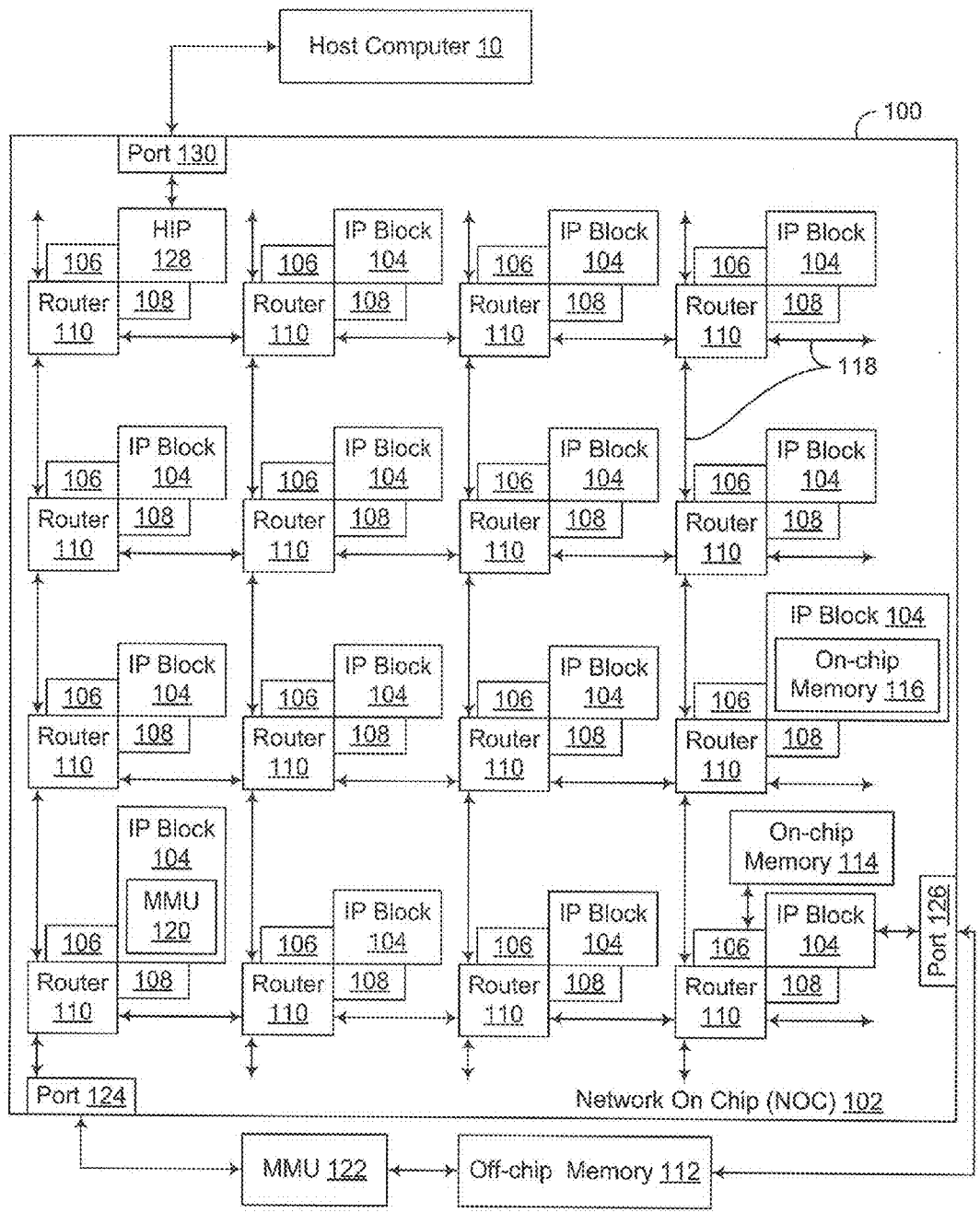
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, non-transitory, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
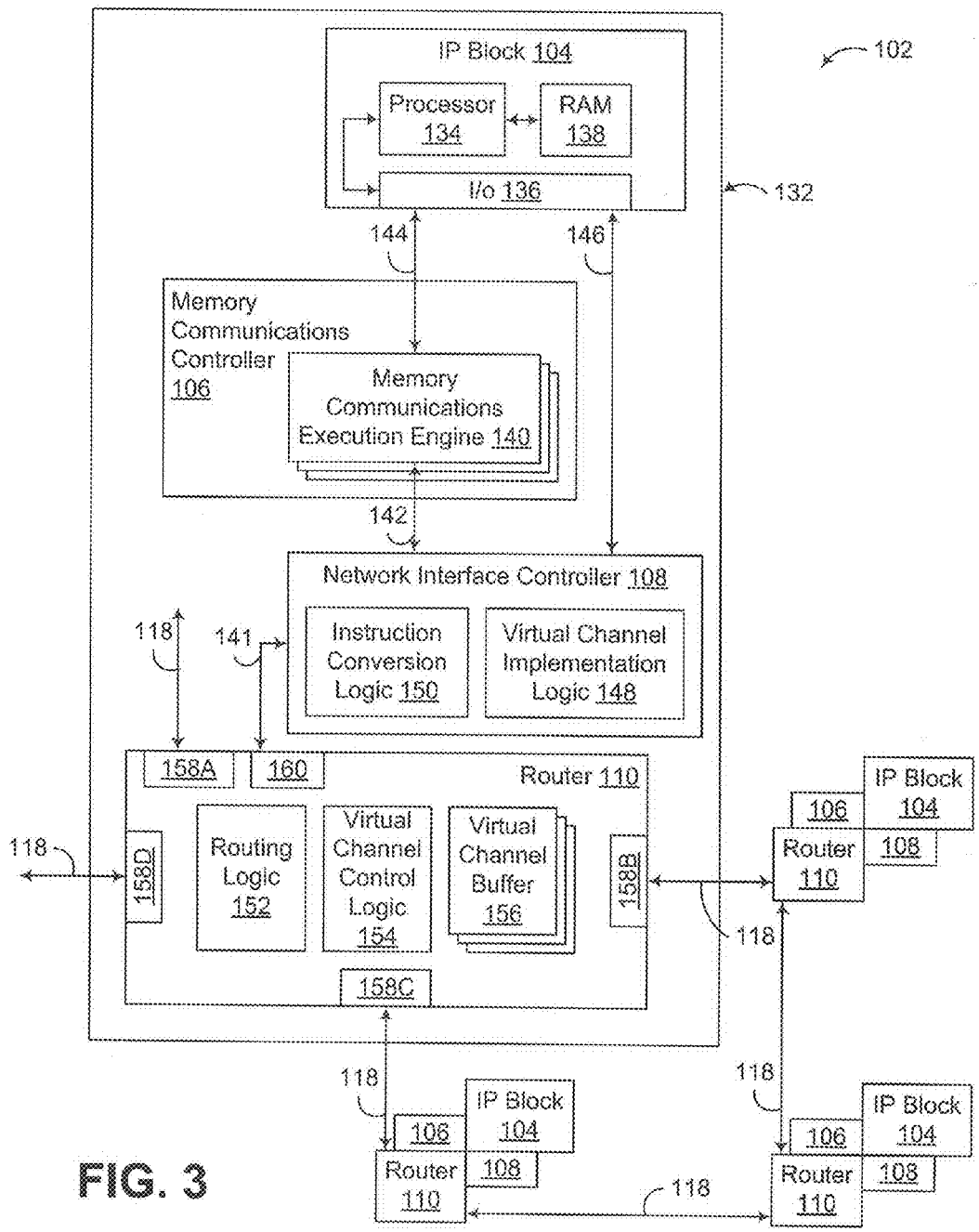
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
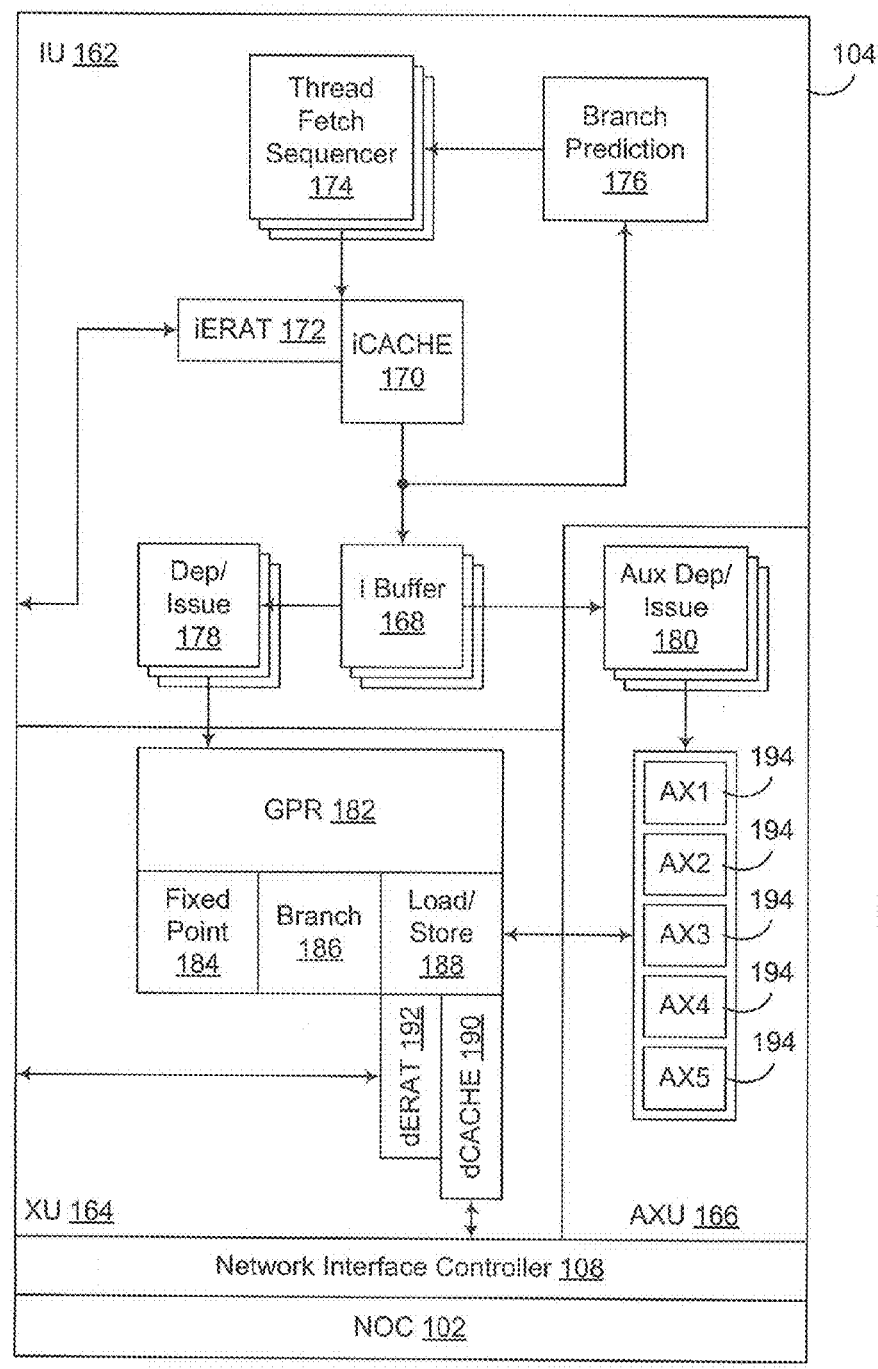
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPRs) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Instruction Unit with Instruction Buffer Bypass

Figure 5:
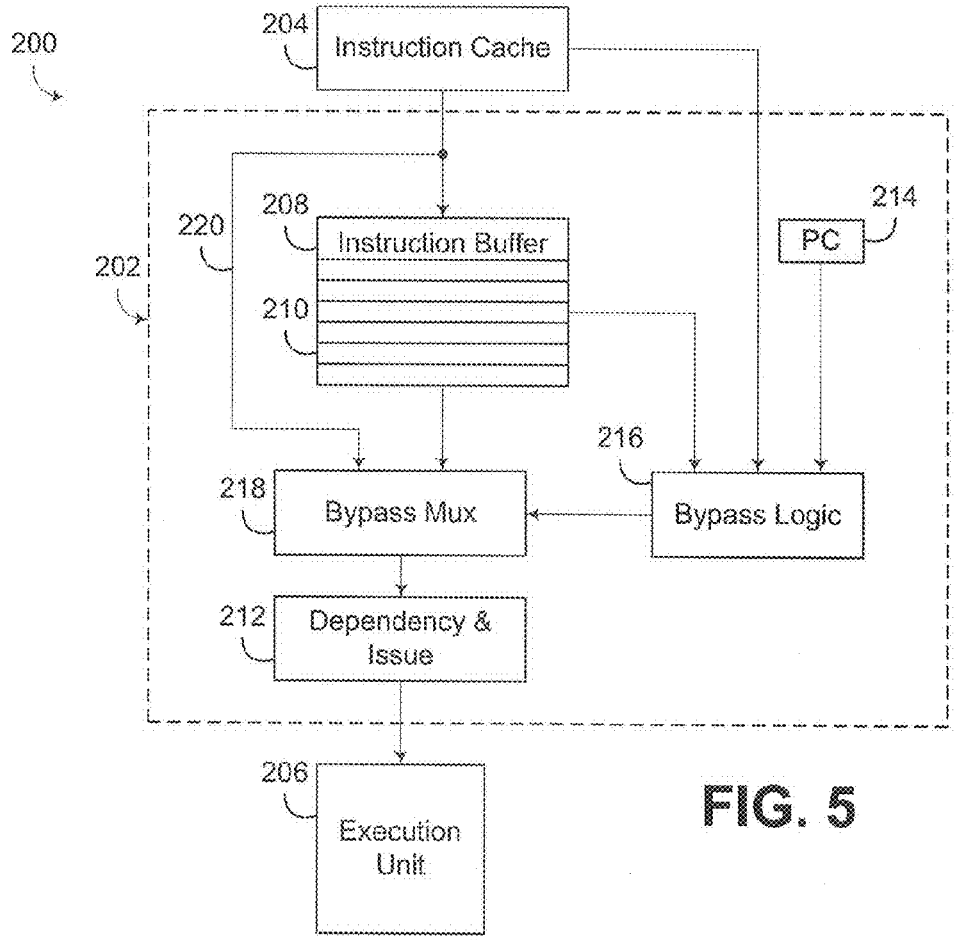
FIG. 5 is a block diagram of a processor unit incorporating an instruction unit with a buffer bypass suitable for implementation in the NOC of FIG. 2.

Turning now to FIG. 5, this figure illustrates a processing unit 200 including an instruction unit 202 incorporating instruction buffer bypass consistent with the invention. FIG. 5 illustrates, in particular, the instruction fetching and dispatching components of processing unit 200, whereby instructions stored in a cache memory such as an L1 instruction cache 204 are dispatched by instruction unit 202 for execution by an execution unit 206.

Instruction unit 202 is a pipelined instruction unit and includes an instruction buffer 208 with a plurality of entries 210, which outputs instructions to dependency and issue logic 212. Logic 212 is used to resolve dependencies between instructions (i.e., identify and delay instructions that cannot be executed until the results of previous instructions have been calculated) and to dispatch instructions to execution unit 206 for execution. A program counter 214 also tracks the memory address of the current instruction.

In the illustrated embodiment, instruction unit 202 also includes bypass logic 216, which is used to control a bypass multiplexer 218 interposed between instruction buffer 208 and dependency and issue logic 212. A bypass line or bus 220 is coupled to an output of instruction cache 204, and is provided to one input of bypass multiplexer 218 to enable the bypass of the instruction buffer to occur. Another input to bypass multiplexer 218 is coupled to an output port of instruction buffer 208, and through control of a select input of bypass multiplexer 218, either the instruction available at the output port of instruction buffer 208, or the instruction available from instruction cache 204 via bypass line 220.

Instruction unit 202 is illustrated as a non-multithreaded instruction unit, where one instruction is dispatched per cycle to execution unit 206. During normal operation, instructions are output by instruction cache 204 and stored in entries 210 of instruction buffer 208, and instruction buffer 208 operates as a first-in-first-out queue so that instructions stored in instruction buffer 208 are output sequentially from the buffer to dependency and issue logic 212 for dispatch to execution unit 206.

In the event that instruction buffer 208 currently has an insufficient number of instructions buffered therein to dispatch to the execution unit, e.g., in the event of a partial or complete flush of the instruction buffer after an instruction redirect such as a branch mispredict, after an instruction cache or translation miss, or in other situations where the instruction buffer is not able to keep up with the execution unit, bypass logic 216 activates bypass multiplexer 218 so that, when a new instruction is output by instruction cache 204, the new instruction will bypass the instruction buffer, and be provided directly to dependency and issue logic 208, thereby bypassing the instruction buffer stage of the instruction pipeline, and eliminating the latency that would otherwise be required for the instruction to pass completely through the instruction buffer.

Bypass logic 216 may rely on a number of inputs to control bypass multiplexer 218. For example, bypass logic 216 may receive valid indicators associated with the various entries 210 in instruction buffer 208 in order to determine how many and which instructions are awaiting dispatch. Bypass logic 216 may also receive the memory address of the current instruction from program counter 214. In addition, bypass logic 216 may receive supply information from instruction cache 204, which provides the bypass logic with an indication of what instructions are coming from the instruction cache and are available for dispatch, e.g., a shadow pipeline.

In addition, through the use of program counter 214, instructions may be indexed without having to store the full addresses in the instruction buffer, and program counter 214 serves to describe the entire instruction buffer contents. As instructions leave the instruction buffer, this "base" program counter value may be incremented appropriately and associated with instructions leaving the buffer. Doing so enables the instructions to be indexed while reducing the amount of storage required for the instruction buffer.

In other embodiments, discussed in greater detail below, bypass logic may receive additional inputs. For example, in multithreaded embodiments, the bypass logic may receive demand information indicative of the number of instructions being requested for a current cycle, e.g., from dependency and issue logic. In other embodiments, where portions of the memory addresses for instructions are stored in the entries in the instruction buffer, such portions may also be used as input to bypass logic. Other information, e.g., branch mispredict or flush indications, may also be used by bypass logic consistent with the invention.

Figure 6:
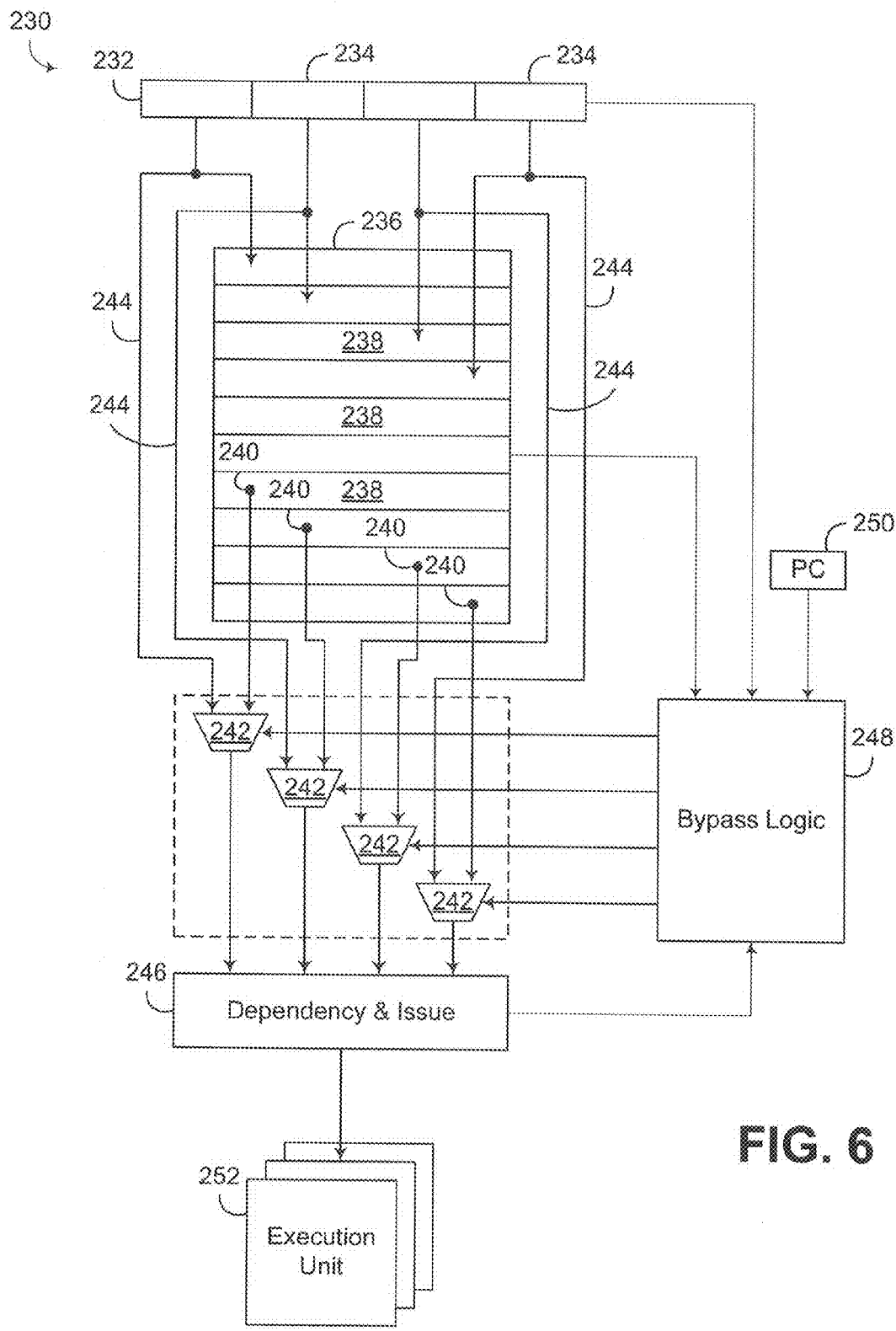
FIG. 6 is a block diagram of an exemplary multithreaded instruction unit incorporating buffer bypass consistent with the invention.

FIG. 6 next illustrates a processing unit including a multithreaded instruction unit 230 incorporating instruction buffer bypass. In this embodiment, an instruction cache (not shown in FIG. 6) outputs cache lines 232 with four instructions 234, such that four instructions may be concurrently output to and stored in an instruction buffer 236. Instruction buffer 236 includes a plurality of entries 238 and four output ports 240, such that four instructions may be concurrently output from instruction buffer 236.

Four bypass multiplexers 242 are also provided, each having one input coupled to an output port 240 of instruction buffer 236, and one input coupled to a bypass line 244 coupled to receive instructions output by the instruction cache. The output of each multiplexer 242 is provided to one of four input ports to dependency and issue logic 246, and a select input to each multiplexer is controlled by bypass logic 248. Bypass logic 248 receives as input validity indications from entries 238, the value of a program counter 250, as well as supply information from the instruction cache and demand information from dependency and issue logic 246. Dependency and issue logic 246 dispatches instructions to one or more execution units 252.

Instruction unit 230 operates in a similar manner to instruction unit 202 of FIG. 5. However, being multithreaded, instruction unit 230 is capable of bypassing multiple instructions (up to four) around instruction buffer 236 in a given cycle. Moreover, given the separate control of each multiplexer 242, bypass logic 248 is capable of mixing bypassed instructions with buffered instructions in a given clock cycle. For example, if instruction buffer 236 only has two pending instructions, but dependency and issue logic 246 is requesting four instructions, bypass logic 248 may output the two pending instructions from instruction buffer 236 concurrently with outputting two bypassed instructions 234 from cache line 232, and cause the remaining two instructions in cache line 232 to be written into instruction buffer 236.

Figure 7:
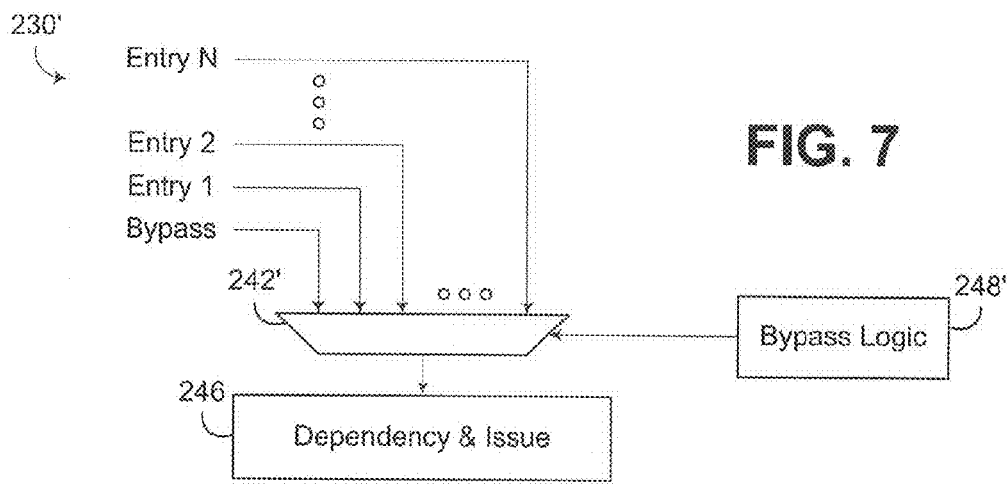
FIG. 7 is a block diagram of an alternate implementation of the instruction unit of FIG. 6, incorporating an alternate bypass multiplexer design.

In the aforementioned embodiments, the bypass multiplexers are capable of selecting between bypassed instructions and instructions output from an output port of an instruction buffer. In other embodiments, however, a bypass multiplexer may also be configured to bypass instructions out of an instruction buffer, i.e., so the instructions are output nonsequentially, or out of the normal execution order. FIG. 7, for example, illustrates a portion of an alternate implementation of an instruction unit 230' that includes a multiplexer 242' that selects between a bypass input, coupled to the output of the instruction cache, and each of N entries (all or a subset of entries) from the instruction buffer (not shown in FIG. 7). Bypass logic 248' is then capable of outputting instructions to dependency and issue logic 246 from various entries in the instruction buffer, as well as bypassing the instruction buffer altogether. Multiple multiplexers 242' may also be used.

By providing bypass out of the instruction buffer, bypass logic 248' can handle instances where only a portion of the instruction buffer needs to be flushed. As an example, in the case of a branch mispredict where the branch points to an instruction that is already stored in the instruction buffer, a flush may occur for the instructions older than the branch target, but rather than retrieving the branch target from the instruction cache, the branch target may be bypassed out-of-order (i.e., non-sequentially) from the instruction buffer.

Figure 8:
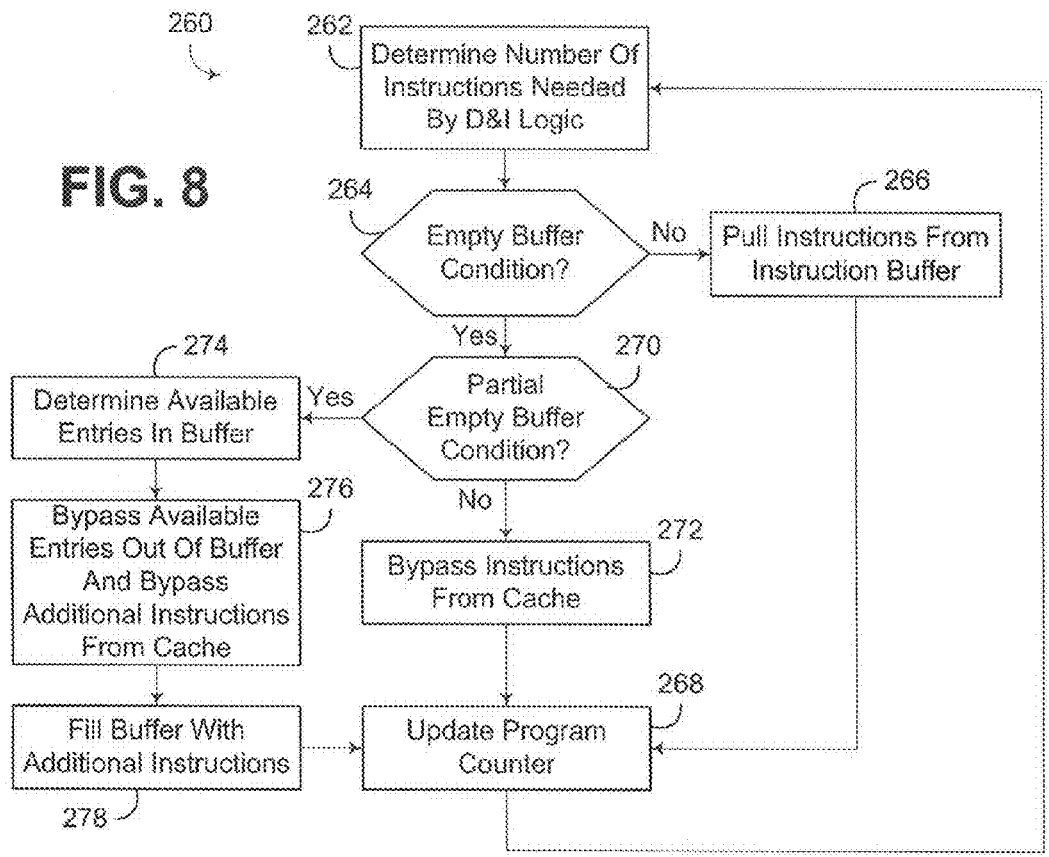
FIG. 8 is a flowchart illustrating the program flow of the bypass logic in the instruction unit of FIG. 7.

FIG. 8 next illustrates the program/logic flow 260 of bypass logic 248' of FIG. 7. It will be appreciated that implementation of such flow in hardware logic would be well within the abilities of one of ordinary skill in the art having the benefit of the instant disclosure. In addition, it will be appreciated that the various operations illustrated in flow 260 also serve to illustrate operations that are relevant to other illustrated embodiments, e.g., the instruction units of FIGS. 5 and 6.

Flow 260 begins in block 262 by determining the number of instructions needed from or requested by the dependency and issue logic, typically using the demand information provided thereby. Block 264 then determines whether an empty buffer condition exists, i.e., whether the instruction buffer current stores an insufficient number of pending instructions capable of supplying the dependency and issue logic.

If not, control passes to block 266 to pull the requested instructions from the instruction buffer, and then to block 268 to update the program count to reflect the current instruction being output by the instruction buffer. Control then returns to block 262 for the next cycle.

Returning to block 264, if an empty buffer condition is detected, control passes to block 270 to determine whether the empty buffer is a partial empty buffer condition, indicating that some instructions are pending in the instruction buffer and available for dispatch. If not, control passes to block 272 to bypass the instruction buffer entirely and cause one or more instructions from the instruction cache to be forwarded to the dependency and issue logic. Control then passes to block 268 to update the program counter and return to block 262.

If, however, a partial empty buffer condition is detected, block 270 passes control to block 274 to determine the number of available entries (pending instructions) in the instruction buffer. Block 276 then bypasses those available entries non-sequentially out of the instruction buffer, concurrently with bypassing additional pending instructions from the instruction cache. Block 278 then fills the instruction buffer with any remaining additional instructions from the instruction cache, and control passes to block 268 to update the program counter and return to block 262.

As an example of the partial empty buffer condition, if the instruction unit pipeline is four instructions wide, and two instructions are pending in the instruction buffer, blocks 276 and 278 may operate by outputting the two pending instructions from the instruction buffer concurrently with two instructions from a four instruction-wide cache line output by the instruction cache, with the remaining two instructions from the cache line forwarded to the instruction buffer for subsequent use in later cycles.

Figure 9:
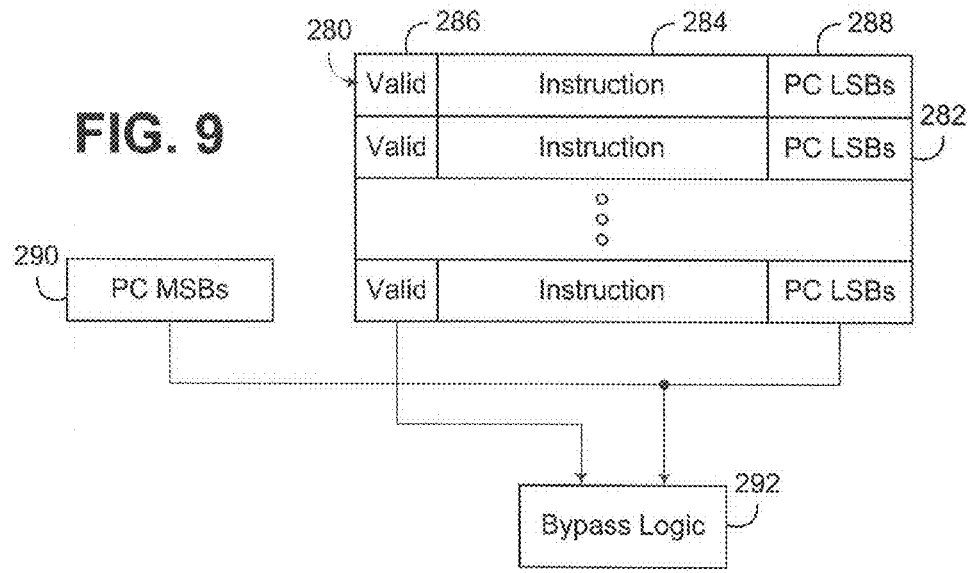
FIG. 9 is a block diagram of another alternate implementation of the instruction unit of FIG. 6.

FIG. 9 illustrates yet another embodiment consistent with the invention, where a portion (e.g., a few least significant bits (LSBs)) of the address of each instruction is stored in the instruction buffer along with each pending instruction, with a program counter maintaining another portion (e.g., the most significant bits (MSBs)) of the address, enabling the address to be reconstituted from the combination of the LSBs and MSBs. In particular, an instruction buffer 280 is illustrated with a plurality of entries 282, each of which includes an instruction field 284 within which the associated instruction is stored, along with a valid indicator (e.g., a valid bit) 286 that indicates whether the entry is associated with a valid (current pending) instruction. In addition, each entry 282 includes LSBs 288 of the memory address for the associated instruction, and a separate program counter 290 maintains the MSBs of the current instruction. The LSBs and MSBs are combined to form a memory address, which is provided along with the valid bits to bypass logic 292 for use in controlling the bypass multiplexer(s). An advantage of this embodiment is that flushes of the instruction buffer may sometimes be avoided for small loop redirects.

It will be appreciated that, by providing bypass capability for an instruction buffer in the manner described herein, a statistical reduction in size of the instruction buffer is possible while maintaining suitable performance. Put another way, comparable performance may be obtained with a smaller instruction buffer. Furthermore, the penalties associated with instruction redirects and instruction buffer flushes may be significantly reduced, thereby leading to improved performance.

Various modifications may be made consistent with the invention. Therefore, the invention lies in the claims hereinafter appended.

What is claimed is:

1. A circuit arrangement, comprising:
    an instruction cache configured to fetch instructions from at least one instruction stream and concurrently output a plurality of instructions;
    a plurality of execution units configured to execute instructions from the instruction cache;
    a symmetric multithreaded (SMT) pipelined instruction unit implemented in hardware and coupled intermediate the instruction cache and the plurality of execution units, the multithreaded pipelined execution unit configured to concurrently dispatch a plurality of instructions from a plurality of threads associated with a plurality of instruction streams to the plurality of execution units, the SMT pipelined instruction unit including:
        an instruction buffer including a plurality of entries and a plurality of output ports, each entry configured to store an instruction awaiting dispatch to an execution unit, each entry including a valid indicator that indicates whether such entry currently stores a valid instruction awaiting dispatch, and each output port configured to output an instruction stored in one of the plurality of entries;
        a plurality of bypass multiplexers, each bypass multiplexer including a first input coupled to an output port among the plurality of output ports, a second input coupled to receive an instruction output by the instruction cache, and an output configured to output an instruction from one of the first and second inputs responsive to a select input; and
        dependency and issue logic including a plurality of input ports respectively configured to receive instructions output by the plurality of bypass multiplexers and selectively dispatch such instructions to the plurality of execution units, the dependency and issue logic configured to output demand information associated with a number of instructions requested by the dependency and issue logic in an upcoming cycle; and
    bypass logic configured to receive the valid indicators of the plurality of entries in the instruction buffer and the demand information from the dependency and issue logic, wherein the bypass logic is configured to, subsequent to a flush of the instruction buffer that results in the instruction buffer currently having buffered therein less than the number of instructions requested by the dependency and issue logic, control the select inputs of the plurality of bypass multiplexers to selectively cause at least one instruction received from the instruction cache to bypass the instruction buffer and be forwarded directly from the instruction cache to the dependency and issue logic;

wherein the SMT pipelined instruction unit is further configured to, when a target instruction for a branch instruction is stored in the instruction buffer and a branch mispredict occurs for the branch instruction, perform a partial flush of the instruction buffer by flushing instructions in the instruction buffer that are older than the target instruction, and wherein the bypass logic is configured to cause the target instruction to be bypassed out-of-order from the instruction buffer in response to the partial flush of the instruction buffer.

2. A circuit arrangement, comprising:

an instruction unit including an instruction buffer configured to buffer instructions received from a cache memory prior to dispatch of the instructions to at least one execution unit, wherein the instruction unit is pipelined and implemented in hardware, and wherein the instruction unit is a symmetric multithreaded (SMT) instruction unit configured to concurrently output a plurality of instructions from a plurality of threads associated with a plurality of instruction streams to a plurality of execution units; and bypass logic coupled to the instruction unit and configured to selectively cause at least one instruction received from the cache memory to bypass the instruction buffer in response to determining that the instruction buffer currently has an insufficient number of instructions buffered therein to dispatch to the at least one execution unit;

wherein the instruction unit is configured to, when a target instruction for a branch instruction is stored in the instruction buffer and a branch mispredict occurs for the branch instruction, perform a partial flush of the instruction buffer by flushing instructions in the instruction buffer that are older than the target instruction, and wherein the bypass logic is configured to cause the target instruction to be bypassed out-of-order from the instruction buffer in response to the partial flush of the instruction buffer.

3. The circuit arrangement of claim 2, wherein the instruction unit further comprises dependency and issue logic disposed in a later pipeline stage from the instruction buffer, and wherein the bypass logic includes at least one multiplexer coupled intermediate the instruction buffer and the dependency and issue logic, the at least one multiplexer including a first input coupled to the instruction buffer and a second input coupled to receive instructions from the cache memory, wherein the bypass logic is configured to selectively cause the at least one instruction to bypass the instruction buffer by selecting the second input of the at least one multiplexer.

4. The circuit arrangement of claim 3, wherein the at least one multiplexer includes a third input coupled to an entry in the instruction buffer, and wherein the bypass logic is further configured to cause an instruction stored in the entry of the instruction buffer to bypass non-sequentially out of the instruction buffer.

5. The circuit arrangement of claim 3, wherein the instruction buffer includes a plurality of output ports, and wherein the bypass logic includes a plurality of multiplexers respectively coupled to the plurality of output ports of the instruction buffer.

6. The circuit arrangement of claim 5, wherein the bypass logic is configured to cause a plurality of instructions received from the cache memory to bypass the instruction buffer in response to the instruction buffer being empty.

7. The circuit arrangement of claim 5, wherein the bypass logic is configured to cause a plurality of instructions received from the cache memory to bypass the instruction buffer in response to a complete flush of the instruction buffer.

8. The circuit arrangement of claim 5, wherein the bypass logic is configured to concurrently cause a first instruction received from the cache memory to bypass the instruction buffer and cause the instruction buffer to output a second instruction stored in the instruction buffer in response to the instruction buffer having an insufficient number of instructions buffered therein to dispatch to the plurality of execution units.

9. The circuit arrangement of claim 5, wherein the bypass logic is configured to concurrently cause a first instruction received from the cache memory to bypass the instruction buffer and cause the instruction buffer to output a second instruction stored in the instruction buffer in response to a partial flush of the instruction buffer.

10. The circuit arrangement of claim 3, wherein the instruction buffer includes a plurality of entries, and wherein the at least one multiplexer includes an input coupled to each entry in the instruction buffer.

11. The circuit arrangement of claim 3, wherein the instruction buffer includes a plurality of entries, and wherein each entry includes a valid indicator that indicates whether the entry currently stores a valid instruction awaiting dispatch, and wherein the bypass logic is configured to receive as input the valid indicators for the plurality of entries in the instruction buffer.

12. The circuit arrangement of claim 11, wherein the bypass logic is further configured to receive as input demand information from the dependency and issue logic that indicates how many instructions are being requested from the instruction buffer.

13. The circuit arrangement of claim 12, wherein the bypass logic is further configured to receive as input supply information from the cache memory indicative of instructions available for dispatch that are stored in the cache memory.

14. The circuit arrangement of claim 11, further comprising a program counter coupled to the bypass logic, the program counter storing at least a portion of an address of an instruction output by the instruction buffer.

15. The circuit arrangement of claim 14, wherein the program counter stores a most significant portion of an address, and wherein each valid entry in the instruction buffer stores a least significant portion of an address associated with an instruction stored in such valid entry, and wherein the bypass logic is configured to receive as input the least significant portion stored in each valid entry in the instruction buffer.

16. An integrated circuit device including the circuit arrangement of claim 2.

17. A method of dispatching instructions in a processing unit, the method comprising:

buffering instructions received from a cache memory in an instruction buffer in a pipelined instruction unit, wherein the pipelined instruction unit is a symmetric multi-threaded (SMT) instruction unit configured to concurrently output a plurality of instructions from a plurality of threads associated with a plurality of instruction streams to a plurality of execution units;

dispatching instructions stored in the instruction buffer to at least one execution unit;

selectively causing at least one instruction received from the cache memory to bypass the instruction buffer in response to determining that the instruction buffer currently has an insufficient number of instructions buffered therein to dispatch to the at least one execution unit;

when a target instruction for a branch instruction is stored in the instruction buffer and a branch mispredict occurs for the branch instruction, performing a partial flush of the instruction buffer by flushing instructions in the instruction buffer that are older than the target instruction; and causing the target instruction to be bypassed out-of-order from the instruction buffer in response to performing the partial flush of the instruction buffer.

18. The method of claim 17, wherein selectively causing the at least one instruction to bypass the instruction buffer includes controlling a multiplexer coupled intermediate the instruction buffer and dependency and issue logic in the pipelined instruction unit, the multiplexer including a first input coupled to the instruction buffer and a second input coupled to receive instructions from the cache memory.

19. The method of claim 18, wherein the instruction buffer includes a plurality of entries, and wherein the multiplexer includes an input coupled to each entry in the instruction buffer.

20. The method of claim 18, wherein the instruction buffer includes a plurality of output ports, and wherein selectively causing at least one instruction to bypass the instruction buffer includes controlling a plurality of multiplexers respectively coupled to the plurality of output ports of the instruction buffer.

21. The method of claim 20, wherein selectively causing at least one instruction to bypass the instruction buffer includes concurrently causing a first instruction received from the cache memory to bypass the instruction buffer and causing the instruction buffer to output a second instruction stored in the instruction buffer in response to the instruction buffer having an insufficient number of instructions buffered therein to dispatch to the plurality of execution units.

22. The method of claim 18, wherein the instruction buffer includes a plurality of entries, wherein each entry includes a valid indicator that indicates whether the entry currently stores a valid instruction awaiting dispatch, wherein the method further comprises receiving the valid indicators from the plurality of entries, demand information that indicates how many instructions are being requested from the instruction buffer, and supply information from the cache memory indicative of instructions available for dispatch that are stored in the cache memory, and wherein selectively causing at least one instruction to bypass the instruction buffer is performed responsive to the valid indicators and the demand and supply information.

23. The method of claim 22, wherein the pipelined instruction unit further comprises a program counter storing at least a portion of an address of an instruction output by the instruction buffer, and wherein selectively causing at least one instruction to bypass the instruction buffer is performed responsive to the program counter.

24. The method of claim 23, wherein the program counter stores a most significant portion of an address, wherein each valid entry in the instruction buffer stores a least significant portion of an address associated with the instruction stored in such valid entry, and wherein selectively causing at least one instruction to bypass the instruction buffer is performed responsive to the least significant portion stored in each valid entry in the instruction buffer.

* * * * *